UNITED STATES PATENT OFFICE.

F. NEIDHARDT, OF EAST SAGINAW, MICHIGAN.

IMPROVED ROOFING COMPOSITION.

Specification forming part of Letters Patent No. 93,333, dated August 3, 1869.

*To all whom it may concern:*

Be it known that I, F. NEIDHARDT, of East Saginaw, in the county of Saginaw and State of Michigan, have invented a new and useful Improvement in Roofing, of which the following is a full, clear, and exact description.

My invention consists in a new and useful composition applied to or in connection with felt to form a roofing, or other like covering, of a water-proof and most durable character, said composition being made up of rosin, beef-tallow, plaster-of-paris, a suitable cement, and hard-wood leaches.

While not confining myself to the precise proportions herein specified for the several ingredients of my improved composition, the following I regard as the best, and mix and apply as hereinafter stated. Thus, to every one hundred (100) square feet of roofing I take fifty-five (55) pounds of rosin, six (6) pounds of beef-tallow, eleven (11) pounds of plaster-of paris, thirty-eight (38) pounds of Oswego cement, and forty-four (44) pounds of hard-wood leached ashes. These several ingredients are put simultaneously and promiscuously into an iron or other suitable kettle, and heat applied to the latter to reduce the mass to a fluid state, in which condition, and while in a warm state, it is poured so as to form a coating of from a quarter ($\frac{1}{4}$) of an inch to half ($\frac{1}{2}$) an inch in thickness, according to the size of the roof, onto the felt previously secured to the roof, on which it is allowed to set.

What is here claimed, and desired to be secured by Letters Patent, is—

A roofing made up of a composition, consisting of the ingredients herein named, in or about the proportions specified, and applied as a coating to felt as a base or covering to the roof, substantially as described.

F. NEIDHARDT.

Witnesses:
  DR. E. FRENZ,
  JNO. H. SPRINGER.